United States Patent Office 3,575,932
Patented Apr. 20, 1971

3,575,932
OXIDIZED ASPHALT RESINS AS MONOMERS FOR THE PRODUCTION OF POLYESTERS
John A. Hedge, Wilmington, Del., and Charles E. Scott, Yardley, Pa., assignors to Sun Oil Company, Philadelphia, Pa.
No Drawing. Filed Jan. 25, 1968, Ser. No. 700,355
Int. Cl. C08g 17/04
U.S. Cl. 260—75          12 Claims

ABSTRACT OF THE DISCLOSURE

A crosslinked polyester is prepared by mixing and curing in the presence of an acid catalyst a composition of a polyol and an oxidized $C_3$–$C_{10}$ hydrocarbon-soluble fraction of asphalt, said fraction containing a plurality of carboxyl groups per molecule, and possibly sulfonic acid groups.

---

This invention relates to oxidized asphalt resins as monomers for the production of polyesters, and to a process for making the same.

Polyester resins are well known in the prior art. They are prepared by the reaction of a polybasic acid and a polyhydric alcohol to form a series of ester linkages. They are in use as surface coatings, binders, moldings, and as impregnating agents for fabrics. However, use of these materials has been hindered by their high cost, and the brittle characteristics of the cured product. We have now developed an easily-cured, crosslinked polyester having superior properties.

Our invention is based on the findings that when the resin fraction of asphalt is oxidized, the oxidized material unites with a polyol in the presence of an acid catalyst at a temperature in the range of 100° C. to 300° C., preferably 100° C. to 200° C. to provide a cured product which is essentially insoluble in benzene. The benzene insolubility indicates the crosslinking characteristics of the polyester. The constituents are preferably present in the pre-cured composition on a weight basis of 8–80% polyol and 20–92% asphalt resin fraction, while the acid catalyst is present in an amount equal to 1–10% of the polyol-oxidized asphalt fraction mixture.

Asphalts are colloidal systems in which the components of higher molecular weight constitute the disperse phase and the components of the lower molecular weight constitute the continuous phase. When asphalt is diluted with an excess of a $C_3$–$C_{10}$ hydrocarbon solvent, the solids separate out. The insolubles are known as asphaltenes and the solubles are known as maltenes or petrolenes. The nature of any separation of asphaltenes and petrolenes is determined by the solvent, conditions, etc. The maltene or petrolene fraction can be separated into a predominantly aliphatic saturated oil fraction and a predominantly aromatic resin fraction by adsorption on alumina or solvent extraction. The technique of separating asphalt is fully described in patents and the literature. Standard texts include Pfeiffer, The Properties of Asphaltic Bitumen, Elsevier, 1950 and Abraham, Asphalts and Allied Substances, Sixth Edition, Van Nostrand, 1960.

The asphalt-derived aromatic resin fraction used in the present invention can be the whole maltene or petrolene fraction or a resin fraction from which the oils have been removed. Somewhat less desired materials are whole asphalts containing less than 5 vol. percent asphaltenes. Whole asphalts containing more than 5 vol. percent asphaltenes are not suitable because the cured resins containing them are too brittle. Preferred solvents for separating asphaltenes from asphalts include the $C_5$–$C_8$ saturated hydrocarbons, i.e., pentane, hexane, heptane, etc. The aromatic resin fraction can contain 30–100 wt. percent aromatic resins, 0–70 wt. percent oils and 0–5 wt. percent asphaltenes.

The polyols to be used in this invention include any organic compound having more than one hydroxy group in the molecule. Examples of suitable polyols are ethylene glycol, tetramethylene glycol, diethylene glycol, glycerol, diglycerol, butantriol-1,2,3, polyoxyethylene diol, polyoxypropylene triol, etc.

Various acid catalysts well known in the art for carrying out esterification can be used in this process. Examples of such are sulfuric acid, toluene sulfonic acid, phosphorous acid, hydrogen chloride, etc.

The oxidation step is generally carried out with nitric acid due to its simplicity and economic considerations. Acids having concentrations of 10–100% are suitable. The acid can be employed in amounts ranging from 10–50 wt. percent (anhydrous basis) based on the resin feed. If sulfonic acid groups are desired on the resin, concentrated sulfuric acid can be employed in amounts of 2–10 wt. percent based on the resin. It should be noted that various methods suitable for oxidizing the $C_3$–$C_{10}$ hydrocarbon soluble fraction of asphalt are functional in the instant process. Another method is the well known chromic acid oxidation as shown in Organic Synthesis, Gilman et al., vol 1 p. 392, John Wiley & Sons, New York, 1956.

Oxidation conditions include a temperature of 0° C. to 200° C., pressures ranging from 10 to 100 p.s.i.a. and reaction times of 1 to 20 hours. $C_4$–$C_{10}$ saturated hydrocarbon solvents can be used if desired. The preferred conditions are atmospheric pressure and refluxing temperature.

It should be noted that the oxidized asphalt resins as employed herein are distinguishable from air-blown asphalts, or as they are sometimes called, oxidized asphalts. The possible confusion is clarified by Kirk and Othmer, Encyclopedia of Chemical Technology, 2nd Edition, vol. 2, p. 772.

Following oxidation, the products are cooled, washed with water, contacted with a $C_4$–$C_{10}$ saturated hydrocarbon solvent and dried. The insoluble oxidation products are recovered in amounts ranging from 30 to 70 wt. percent based on the total product.

The oxidized asphalt derived resins contain a plurality of carboxyl groups per molecule, generally, from 2 to 5 carboxyl groups per molecule. Preferably, the resin contains 2 to 3 carboxyl groups per molecule. When sulfuric acid is used to add sulfonic acid groups, the total number of acid groups is increased by 1–3. The number of acid groups is determined by total acid number determination (ASTM D–664–54).

The invention is further illustrated by the following nonlimiting examples:

EXAMPLE 1

This example describes the preparation of a maltene fraction for oxidation.

A Lagomedio crude oil was vacuum distilled to produce a resin having the following properties:

Specific gravity _____ 1.01
Penetration—32° F. _____ 41
Penetration—77° F. _____ 141
Softening point (ring and ball) ° F. _____ 100
Solubility, $CCl_4$ _____ 99.69
Solubility 86° F. naphtha _____ 84.9

The residuum was extracted with about 20 volumes of n-hexane at 70° F. The asphaltenes which are insoluble in the solvent were filtered out. The maltene product was a black semisolid having a ring and ball softening point of 73.5° F. and a molecular weight of 890. The fraction contained 35 percent oils and 65 percent resins.

If desired, the oils can be separated from the resins by chromatography, however, this is not necessary. The oils are not significantly oxidized by nitric acid.

EXAMPLE 2

The maltene fraction of the previous example was oxidized in the following manner:

One hundred and 10 grams of the maltenes were mixed with 70 milliliters of 40 percent nitric acid. The acid was added drop-wise over a period of approximately one hour. The oxidation was carried out at refluxing temperature (100° C. to 105° C.) and atmospheric pressure in a glass reactor equipped with a motor-driven stirrer. The oxidation was terminated after four hours. One hundred and 30 grams of the oxidized products was recovered and 67 percent of this material was hexane insoluble. The insoluble oxidized resin had a molecular weight of 1877 and a total acid number of 72 (ASTM D-664-54). The product contained 2.41 carboxylic groups per molecule—calculated.

EXAMPLE 3

A cured product was prepared as follows:

One gram of oxidized resins was blended with three grams of "Voranol CP-3001," a Dow Chemical Company primary hydroxyl terminated polyoxypropylene triol having a molecular weight of 3000. 0.1 gram of concentrated sulfuric acid was added to the blend. The composition was mixed and cured at 150° C. for seven hours. A hard product which was benzene insoluble was obtained.

EXAMPLE 4

A crosslinked polyester was formed by carrying out the procedure as set forth in Example 3. However, in this example one gram of "Niax Diol PPG 1025" a Union Carbide 1,000 molecular weight polyoxyethylene diol was employed as the polyol. A similar product was obtained.

EXAMPLE 5

A crosslinked polyester was again formed using the procedure set forth in Example 3, except that the polyol employed was 0.1 gram of glycerin. The product was benzene insoluble.

While the particular compositions and methods of application described herein are well adapted to meet the objects of the present invention, various modifications or changes, such as the addition of glass fibers and other fillers for greater impact properties, or the use of compression molding, may be resorted to without departing from the scope of the invention as defined in the claims.

We claim:

1. A polyester resin of a polyol selected from the group consisting of ethylene glycol, tetramethylene glycol, diethylene glycol, glycerol, diglycerol, butantriol-1,2,3, polyoxyethylene diol, and polyoxypropylene triol and an acid-oxidized $C_3$–$C_{10}$ hydrocarbon-soluble, polycarboxylic acid-containing asphalt fraction.

2. A polyester as in claim 1 wherein the asphalt fraction is a maltene.

3. A polyester as in claim 1 where the asphalt fraction is oxidized with nitric acid.

4. A polyester as in claim 3 wherein the asphalt fraction contains sulfonic acid groups.

5. A polyester as in claim 3 wherein the polyol portion is 8–80 weight percent and the maltene fraction is 20–92 weight percent.

6. A polyester as in claim 3 where the polyol is a primary hydroxyl terminated polyoxypropylene triol having a molecular weight of about 3000.

7. A polyester as in claim 3 where the polyol is a polyoxyethylene diol of a molecular of about 1000.

8. A process for preparing cross-linked polyesters which comprises mixing from 8–80 percent by weight of a polyol with 20–92 percent by weight of an acid-oxidized $C_3$–$C_{10}$ hydrocarbon soluble fraction of asphalt containing a plurality of carboxyl groups per molecule, adding to said mixture an acid catalyst in an amount of about 1 to about 10 weight percent of the mixture and heating the mixture at a temperature in the range of 100–300° C.

9. A process as in claim 8 where the asphalt is a maltene.

10. A process as in claim 9 where the asphalt is oxidized with nitric acid.

11. A process as in claim 9 where the polyol is a primary hydroxyl terminated polyoxypropylene triol having a molecular weight of about 3000.

12. A process as in claim 9 where the polyol is a polyoxyethylene diol having a molecular weight of about 1000.

References Cited

UNITED STATES PATENTS

| | | | |
|---|---|---|---|
| 2,965,587 | 12/1960 | Rickert | 260—22 |
| 3,154,507 | 10/1964 | Kramer et al. | 260—22 |
| 3,293,223 | 12/1966 | Duling | 260—75 |
| 3,338,854 | 8/1967 | Hedge et al. | 260—28 |

FOREIGN PATENTS

| | | |
|---|---|---|
| 967,028 | 9/1957 | Germany. |

WILLIAM H. SHORT, Primary Examiner

M. GOLDSTEIN, Assistant Examiner

U.S. Cl. X.R.

208—44; 260—40